US012697708B1

(12) United States Patent
Mihelich

(10) Patent No.: US 12,697,708 B1
(45) Date of Patent: Aug. 4, 2026

(54) COMBINATION TOOL BOX AND BENCH

(71) Applicant: Nicholas Mihelich, West Palm Beach, FL (US)

(72) Inventor: Nicholas Mihelich, West Palm Beach, FL (US)

( * ) Notice: Subject to any disclaimer, the term of this patent is extended or adjusted under 35 U.S.C. 154(b) by 301 days.

(21) Appl. No.: 18/543,431

(22) Filed: Dec. 18, 2023

(51) Int. Cl.

| | |
|---|---|
| ***B25H 1/12*** | (2006.01) |
| ***A47C 7/62*** | (2006.01) |
| ***A47C 9/02*** | (2006.01) |
| ***A47C 12/00*** | (2006.01) |
| ***B25H 1/04*** | (2006.01) |
| ***B25H 3/02*** | (2006.01) |

(52) U.S. Cl.
CPC ............... *B25H 1/12* (2013.01); *A47C 7/626* (2018.08); *A47C 9/02* (2013.01); *A47C 12/00* (2013.01); *B25H 1/04* (2013.01); *B25H 3/02* (2013.01)

(58) Field of Classification Search
CPC .................................. B25H 1/12; A47C 7/262
See application file for complete search history.

(56) References Cited

U.S. PATENT DOCUMENTS 2,727,543 A * 12/1955 Polselli .................... B25H 1/06 144/285
3,092,428 A * 6/1963 Kerschner ................ B25H 3/02 312/289
3,099,398 A * 7/1963 Croteau ................... B25H 3/02 439/577
3,232,686 A * 2/1966 Syler ........................ A47C 9/00 108/26
4,061,395 A * 12/1977 Boole .................... A47C 7/626 297/188.11
4,303,158 A * 12/1981 Perkins .................. A45C 11/24 312/902
4,366,998 A * 1/1983 Kaiser ...................... B25H 1/12 312/286
4,659,154 A * 4/1987 Jenkins .................. A01K 97/26 312/277
4,779,940 A * 10/1988 Ralston .................... B25H 1/12 312/240
5,282,519 A * 2/1994 Venturo ................... B25H 1/06 D25/67
5,806,947 A * 9/1998 Meisner ................... B25H 1/12 292/87
5,893,572 A * 4/1999 Parks ........................ B62B 1/26 D34/24
5,927,837 A * 7/1999 Schmidt ................. B25H 3/028 312/289
6,010,187 A * 1/2000 Dallas ...................... A47C 9/02 297/188.2

(Continued)

*Primary Examiner* — Brian L Swenson
(74) *Attorney, Agent, or Firm* — Sanchelima & Associates, P.A.; Christian Sanchelima; Jesus Sanchelima

(57) ABSTRACT

A combination tool box and bench including a legs assembly, a first level assembly and a second level assembly. The first level assembly includes a rear storing portion, a front storing portion and at least one drawer slidable attached to a bottom end of said rear storing portion and said front storing portion. The legs assembly supports the first level assembly. The second level assembly includes a lateral support and a top plate. The lateral supports extend perpendicularly upwards from a left side and a right side of the first level assembly. The top plate is attached to a top end of the lateral supports. The top plate is parallel to the first level assembly.

12 Claims, 4 Drawing Sheets

(56) References Cited

U.S. PATENT DOCUMENTS

| | | | | |
|---|---|---|---|---|
| 7,658,442 | B1 * | 2/2010 | Whiteside | A47C 7/626 297/188.11 |
| 9,259,836 | B2 | 2/2016 | Raphel | |
| 9,687,080 | B1 * | 6/2017 | Thiel | A47C 9/02 |
| 10,306,993 | B1 * | 6/2019 | Clarke | H02S 10/40 |
| 10,919,141 | B2 | 2/2021 | Omry et al. | |
| 11,470,973 | B1 * | 10/2022 | Yu | A47C 7/628 |
| 2002/0105129 | A1 * | 8/2002 | Levy | B25H 1/06 269/45 |
| 2003/0201699 | A1 * | 10/2003 | Hong | A47B 46/00 312/249.11 |
| 2004/0195790 | A1 * | 10/2004 | Wong Hahn | B25H 3/028 280/47.19 |
| 2013/0047895 | A1 * | 2/2013 | Huang | A47B 83/045 108/41 |
| 2015/0352710 | A1 * | 12/2015 | Raphel | A47C 12/00 206/372 |
| 2016/0058171 | A1 * | 3/2016 | Moyer | A47B 3/0803 29/428 |
| 2017/0164751 | A1 * | 6/2017 | Huang | A47C 7/62 |
| 2021/0237255 | A1 * | 8/2021 | Stathis | B25H 1/12 |

* cited by examiner

COMBINATION TOOL BOX AND BENCH

BACKGROUND OF THE INVENTION

1. Field of the Invention

The present invention relates to a combination tool box and bench and, more particularly, to a combination tool box and bench that allows storing tools, be used as a ladder, as a bench and as a sitting workstation on wheels.

2. Description of the Related Art

Several designs for tool boxes have been designed in the past. None of them, however, include a bottom storing portion comprising a storage area bifurcated with a central divider, and at least one underside sliding storage drawer.

Applicant believes that a related reference corresponds to U.S. Pat. No. 10,919,141 issued for a combination tool box and step stool with deployable legs. Applicant believes that another related reference corresponds to U.S. Pat. No. 9,259,836 issued for a tool box that can also be used as a step stool or bench. None of these references, however, teach of a combination tool box and bench that is comprised of a wooden tool storage and transportation container with an elevated platform which allows the container to be used to transport tools to a location where the container can then be used as a workbench, a seat, a sawhorse, or a stepping tool.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a combination tool box and bench that includes a top level to be used as a table and a ladder.

It is another object of this invention to provide a combination tool box and bench that includes wheels to allow movement of the present invention and ease low area work such as on floor, baseboard or walls.

It is another object of this invention to provide a combination tool box and bench that includes a handle placed on the uppermost end of the bench.

It is still another object of the present invention to provide a combination tool box and bench that includes a cutout on a bottom middle of the side legs to allow having power cords, cables, or ropes to be aligned with the notch, enabling the tool bench to remain flat.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
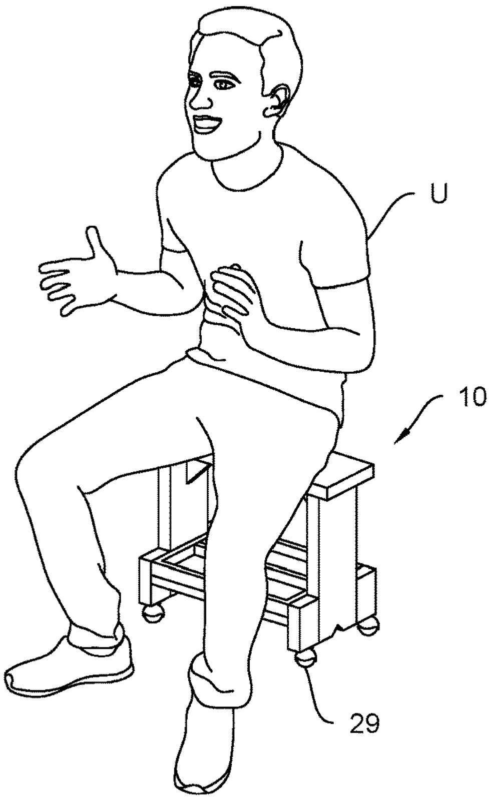
FIG. 1 represents an isometric operational view of the present invention 10 having user U seated thereon.

Referring now to the drawings, where the present invention is generally referred to with numeral 10, it can be observed that it basically includes a legs assembly 20, an first level assembly 40 and a second level assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
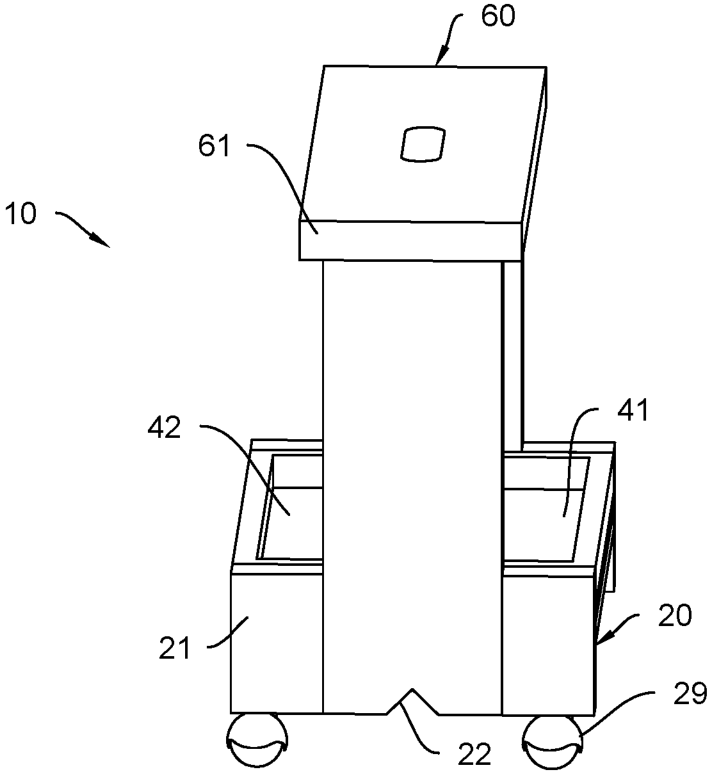
FIG. 4 is a representation of a side view of the present invention 10.

As best illustrated in FIG. 4, the legs assembly 20 may include a rectangular frame 21 and wheels 29. In a preferred embodiment, wheels 29 may be spherical wheels suitable to rotate on its own axis. It also may be suitable for the wheels 29 to be any other type of wheels 29. The wheels 29 may be made of plastic, metal, or any other resistant material. The wheels 29 may be removable attached to the rectangular frame 21. The wheels 29 may be used for self-propelled mobility in a seated position. In a preferred embodiment the rectangular frame 21 may include a left wall and a right wall. In yet another embodiment the rectangular frame 21 may include a left wall, a right wall, a front wall and a rear wall. The rectangular frame 21 may be formed by two parallel rectangular pieces of wood. The rectangular frame 21 may define legs that support the weight of the present invention 10. The wheels 29 may be attached on a bottom portion of the legs of the rectangular frame 21.

Figure 5:
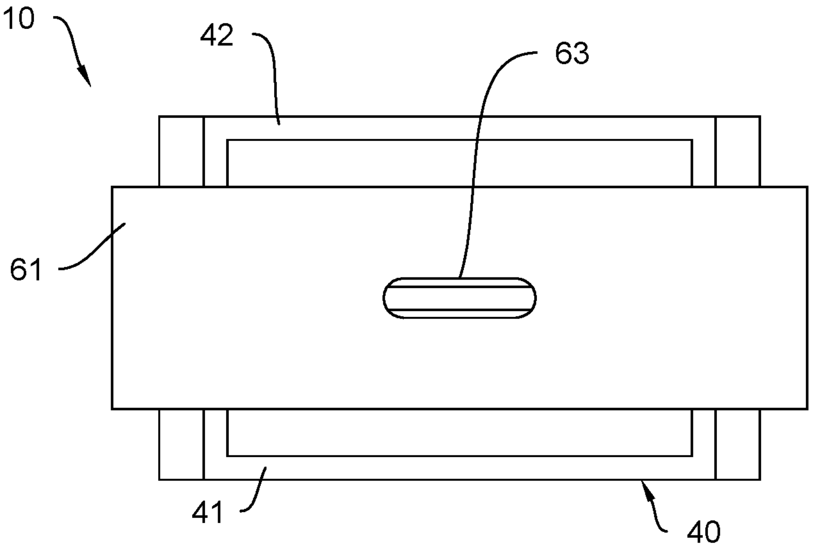
FIG. 5 depicts a top view of the present invention 10.

As best shown in FIG. 5, the rectangular frame 21 may include notches 22. In a preferred embodiment the notches 22 may be formed on a central-bottom portion of the left wall and right wall of the rectangular frame 21. The notches 22 may preferably be openings having a triangular shape. It also may be suitable for the notches 22 to have a circular shape, a rectangular shape, or any other suitable shape. The notches 22 may be used to organize cables by placing the cables therethrough.

Figure 3:
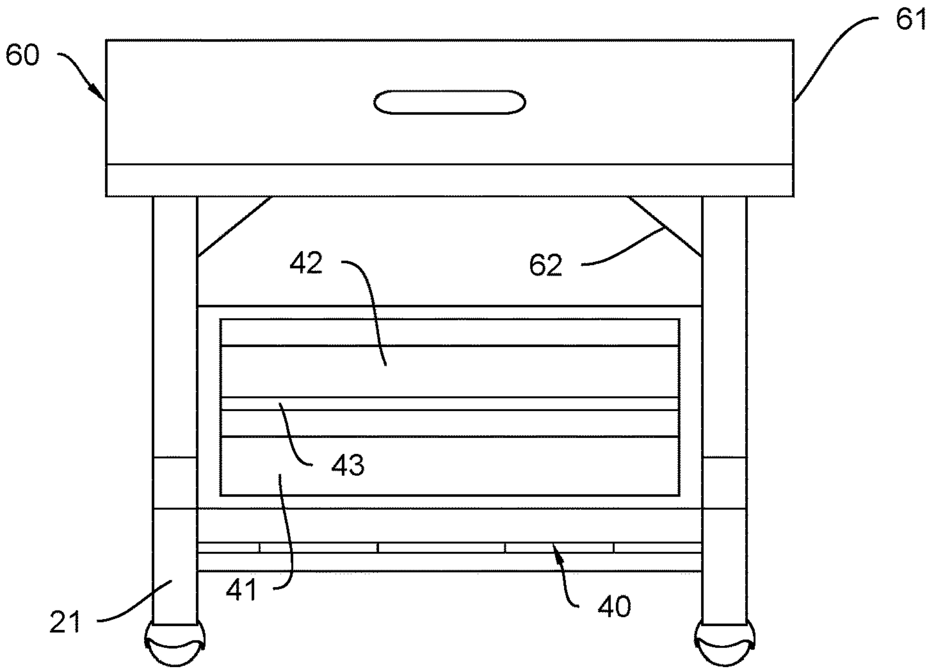
FIG. 3 illustrates a front perspective view of the present invention 10.

Referring now to the first level assembly 40 it can be illustrated in FIG. 3 that it basically includes a first drawer 49, a second drawer 50, a front storing portion 41, a rear storing portion 42 and a central divider 43. In a preferred embodiment the front storing portion 41 and the rear storing portion 42 may be formed by a rectangular plate sitting atop of the rectangular frame 21. The rear storing portion 42 and the front storing portion 41 may have a frame extending about side edges thereof. The rear storing portion 42 and the front storing portion 41 may be rectangular containers having sidewalls and a bottom. The rear storing portion 42 and the front storing portion 41 may be divided through by the central divider 43. The central divider 43 may be a rectangular member extending perpendicularly between the right wall and the left wall of the rectangular frame 21. As best illustrated in FIG. 1C the rear storing portion 42 and the front storing portion 41 may allow storing multiple tools 102 therein. The first drawer 49 may be slidable attached beneath the rear storing portion 42. The second drawer 50 may be slidable attached beneath the front storing portion 41. The first drawer 49 and the second drawer 50 may be made of wood, or any other suitable material. The first drawer 49 and the second drawer 50 may include multiple compartments therein.

Figure 2:
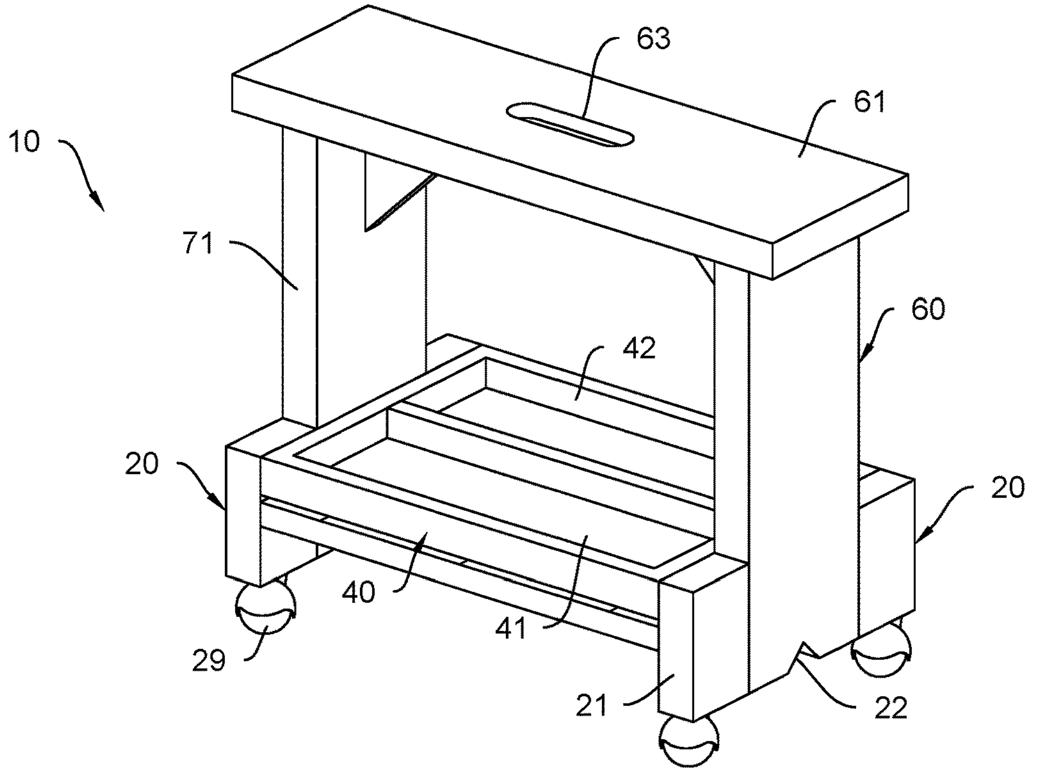
FIG. 2 shows an isometric view of the present invention 10. The present invention 10 includes a legs assembly 20, a first level assembly 40 and a second level assembly 60.

Referring now to FIG. 2 it can be illustrated that the second level assembly 60 may include lateral supports 71, a top plate 61 and brackets 62. As best illustrated in FIG. 4, the lateral supports 71 may have a rectangular elongated shape. It also may be suitable for the lateral supports 71 to have an oval shape, a triangular shape or any other suitable shape. Each of the lateral supports 71 may extend perpendicular from a central-right and a central-left portion of the first level assembly 40. In a preferred embodiment the lateral supports 71 may be two lateral supports parallel therebetween having a predetermined height. The lateral supports 71 may have a vertical configuration.

The top plate 61 may have a rectangular shape. The top plate 61 may be perpendicularly placed between the lateral supports 71. The top plate 61 may be elevated a predetermined distance. The top plate 61 may be parallel to the first level assembly. The top plate 61 may have a handle 63. The handle 63 may be located on a top central portion of the top plate 61. In a preferred embodiment the handle 63 may be located on a central portion of the top plate 61. In a preferred embodiment the handle 63 may be an oval opening that goes through a central portion of the top plate 61. The brackets 62 may have a triangular shape. It also may be suitable for the brackets 62 to have a triangular shape, a semicircular shape, or any other suitable shape. The brackets 62 may be placed connecting the lateral supports 71 and the top plate 61. The brackets 62 may provide support to the top plate 61.

Figure 1A:
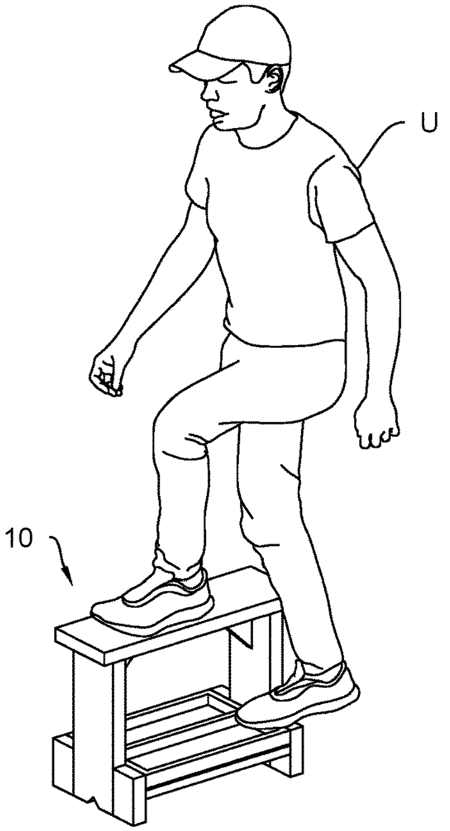
FIG. 1A depicts an isometric operational view of the present invention 10 in a ladder configuration 10.
Figure 1B:
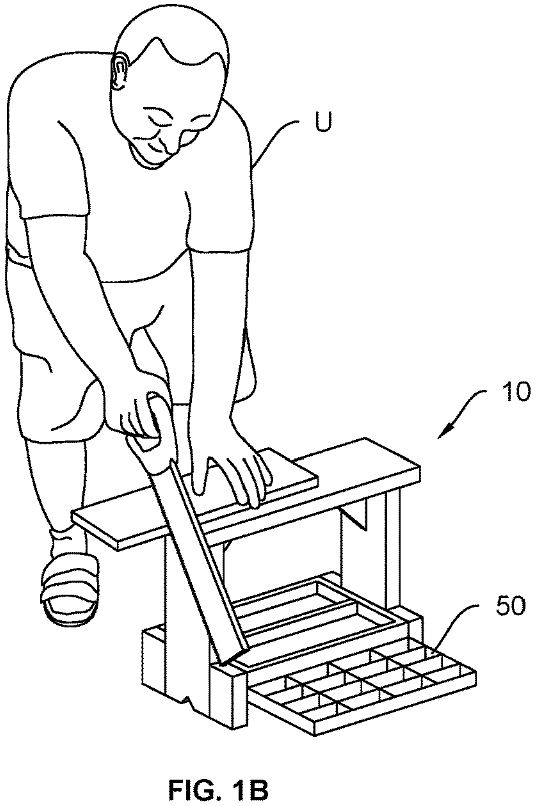
FIG. 1B shows an isometric operational view of the present invention 10 used as a support.
Figure 1C:
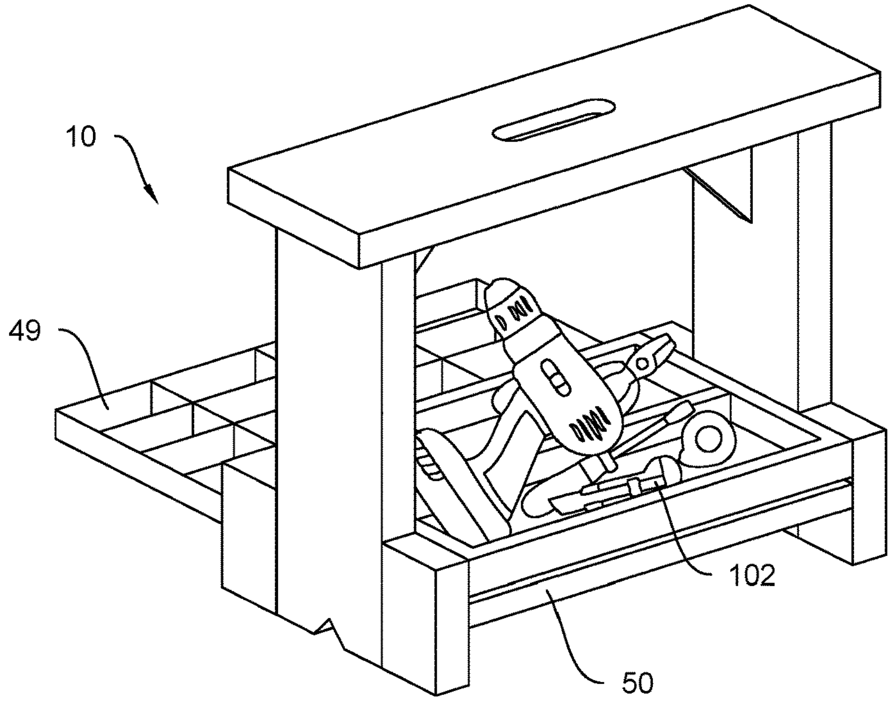
FIG. 1C is an illustration of an isometric operational view of the present invention 10 in a storage configuration.
Figure 1D:
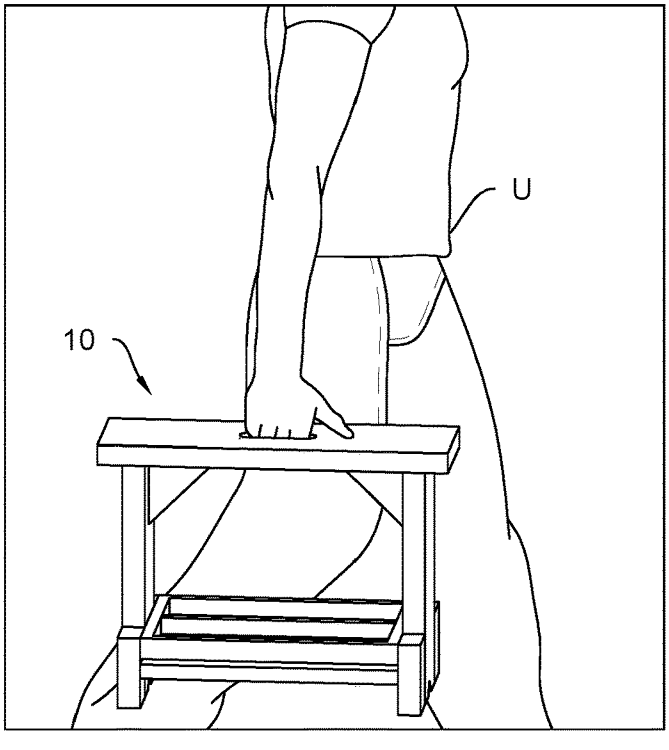
FIG. 1D depicts an isometric operational view of the present invention 10 being carried out by user U.

As best illustrated in FIG. 1 the top plate 61 may be used to sit therein, to place objects therein, as a support or as seated workstation for low areas. The combination of the first level assembly 40 and the top plate 61 may be used as a ladder, as best illustrated in FIG. 1A. In a preferred embodiment the present invention 10 is made of wood. It also may be suitable for the present invention 10 to be made of metal, plastic, or any combination thereof. The wheels 49 may be The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A combination tool box and bench, comprising:

a legs assembly, including a left wall and a right wall, wherein each of said left wall and said right wall include a triangular opening in a bottom central portion of each of said left wall and said right wall;

a first level assembly, wherein said first level assembly includes a rear storing portion and a front storing portion divided through by a central divider having a vertical height which does not extend over the vertical height of the perimeter walls of the first level assembly to define a continuous upper opening, thereby allowing unobstructed access to both the front and rear storing portions, wherein said legs assembly supports said first level assembly; and a second level assembly, wherein said second level assembly includes a lateral supports and a top plate, said lateral supports extend perpendicularly upwards from a left side and a right side of said first level assembly, wherein said top plate is attached to a top end of said lateral supports, wherein said top plate is parallel to said first level assembly.

2. The combination tool box and bench set forth in claim 1, wherein said first level assembly includes a bottom plate having a rectangular shape, said bottom plate having a divider on a central portion thereof.

3. The combination tool box and bench set forth in claim 1, wherein said top plate has a rectangular shape, wherein said top plate has a handle.

4. The combination tool box and bench set forth in claim 3, wherein said handle is an oval opening going through a central portion of said top plate.

5. The combination tool box and bench set forth in claim 1, wherein attachment of said top plate with said lateral supports is supported by means of brackets.

6. The combination tool box and bench set forth in claim 5, wherein said brackets have a triangular shape.

7. The combination tool box and bench set forth in claim 1, wherein said legs assembly, said first assembly and said second level assembly are made of wood.

8. The combination tool box and bench set forth in claim 1, wherein said legs assembly includes wheels, the wheels are removable attached to a bottom end of said left wall and said right wall.

9. The combination tool box and bench set forth in claim 1, wherein said first level assembly includes at least one drawer slidable attached to a bottom end of said first level.

10. The combination tool box and bench set forth in claim 9, wherein said first level assembly includes a first drawer and a second drawer, wherein the first drawer may be slidable attached beneath the rear storing portion and the second drawer may be slidable attached beneath the front storing portion.

11. A combination tool box and bench, comprising:

a legs assembly, wherein said legs assembly includes a left wall and a right wall, wherein each of said left wall and said right wall include a triangular opening in a bottom central portion of each of said left wall and said right wall;

a first level assembly, wherein said first level assembly includes a rear storing portion and a front storing portion divided through by a central divider having a vertical height which does not extend over the vertical height of the perimeter walls of the first level assembly to define a continuous upper opening, thereby allowing unobstructed access to both the front and rear storing portions, wherein said legs assembly supports said first level assembly, wherein said first level assembly includes at least one drawer slidable attached to a bottom end of said first level; and a second level assembly, wherein said second level assembly includes a lateral supports and a top plate, said lateral supports extend perpendicularly upwards from a left side and a right side of said first level assembly, wherein said top plate is attached to a top end of said lateral supports, wherein said top plate is parallel to said first level assembly, wherein said top plate has a rectangular shape, wherein said top plate has a handle, wherein said handle is an oval opening going through a central portion of said top plate.

12. A combination tool box and bench, consisting of:

a legs assembly, wherein said legs assembly includes wheels, a left wall and a right wall, wherein each of said left wall and said right wall include a triangular opening in a bottom central portion of each of said left wall and said right wall, wherein said wheels are removable attached to a bottom end of said left wall and said right wall;

a first level assembly, wherein said first level assembly includes a bottom plate having a rectangular shape and at least one drawer, wherein said bottom plate having a divider on a central portion thereof defining a rear storing portion and a front storing portion, wherein said divider has a vertical height which does not extend over the vertical height of the perimeter walls of the first level assembly to define a continuous upper opening, thereby allowing unobstructed access to both the front and rear storing portions, wherein said legs assembly supports said first level assembly, wherein said at least one drawer is slidable attached to a bottom end of said first level; and a second level assembly, wherein said second level assembly includes a lateral supports and a top plate, said lateral supports extend perpendicularly upwards from a left side and a right side of said first level assembly, wherein said top plate is attached to a top end of said lateral supports, wherein said top plate is parallel to said first level assembly, wherein said top plate has a rectangular shape, wherein said top plate has a handle, wherein said handle is an oval opening going through a central portion of said top plate, wherein attachment of said top plate with said lateral supports is supported by means of brackets, wherein said brackets have a triangular shape, wherein said legs assembly, said first assembly and said second level assembly are made of wood.

* * * * *